UNITED STATES PATENT OFFICE.

GUSTAV BLIEBERGER, OF NEW YORK, N. Y.

MENTHYLATED OIL OF WINTERGREEN.

979,416.  Specification of Letters Patent.  Patented Dec. 27, 1910.

No Drawing.  Application filed April 27, 1910.  Serial No. 557,866.

*To all whom it may concern:*

Be it known that I, GUSTAV BLIEBERGER, a citizen of the Empire of Austria-Hungary, and a resident of New York, in the county and State of New York, have invented a new and useful Chemical Compound, the Menthylated Oil of Wintergreen, and the Process of Producing Same.

As is well known, the oil of wintergreen or the oil of *Gaultheria procumbens* consists almost wholly of the methylic ester of the salicylic acid which combines directly with metallic bases such as potassium, barium and the like because it contains a hydroxyl group as is apparent from its constitutional formula

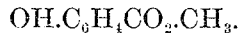

$$OH.C_6H_4CO_2.CH_3.$$

This indicates that condensation with organic radicals may also be possible. Menthol likewise possesses a hydroxyl group as is seen from its constitutional formula

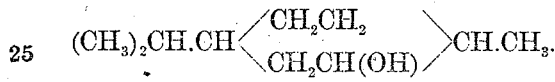

The action of menthol toward acetic acid when beginning to form acetate of menthol shows the action of secondary alcohols. Thus the principal constituent of the oil of wintergreen forms combinations with bases practically like an organic acid and the menthol shows the characteristics of an alcohol whereby all the conditions are given for producing a new chemical compound which is supposed to be an ester.

The well known medicinal properties of the two components used for producing the new chemical compound need not be described here. It is self evident that the new compound possesses the combined beneficial properties of both substances to a certain extent whereby a compound is produced particularly well adapted for instance as a resorbent of uric acid in the system. The transformation of the two substances or their condensation is not easily effected. However I have discovered that the transformation into a compound ether is gradually effected when both substances are heated under the pressure of carbonic acid gas for rather a very long time at a temperature approaching nearly the boiling point of the oil of wintergreen.

In carrying the invention into effect I substantially proceed as follows: About equal parts of oil of wintergreen and menthol are mixed. The menthol is preferably somewhat reduced before it is put into the oil of wintergreen. Equal parts by weight of both substances represent almost chemically equivalent quantities of the substances because the molecular weight of menthol is 156 and that of the methylic ester of salicylic acid is 152. The mixture is placed in a closed vessel of suitable material preferably of copper tinned on the inside and heated by means of an oil bath, the constituents of which are so selected that heat over 200° C. may be produced thereby. The heating is effected in an atmosphere of carbon dioxid, the closed vessel being in connection with a cylinder containing liquid carbonic acid gas so that there is a carbon dioxid atmosphere under pressure within the vessel while heating. According to the quantities employed the heating is continued for various lengths of time, for from 72 to 100 hours. At any rate the transformation into an ester or the condensation of the two substances progresses very slowly, evidently under separation of one molecule of water. When the substances have combined the mixture is allowed to cool sufficiently to be transferred into a distillation apparatus and heated in a suitable bath somewhat higher than before, to 275° C., in a partial vacuum until the new compound distils over. The partial vacuum is created by means of a suitable suction device which first takes out the air and then part of the vapors so that there is a pressure of about 18 inches within the vessel. The distillate is collected in a suitable vessel and represents a yellowish brown liquid of oily consistency which is somewhat turbid or cloudy. In order to purify the new product it is poured over solid caustic soda and stirred and at once filtered whereby the yellowish brown cloudy liquid becomes clear and transparent and assumes a yellowish color having a characteristic golden yellowish tint. The menthylated oil of wintergreen thus exists in form of an oily liquid while the menthol used as one component in its preparation is a solid substance. The menthylated oil of wintergreen represents a yellowish transparent liquid which is almost free from taste and odor. It is soluble in concentrated alcohol, ether, chloroform and fatty oils and has a specific gravity of 1.03709 at about 29° C. It passes over at a temperature of 255 to 265° C. When chlorid of iron is added the product becomes red.

The new compound is a beneficial remedy against rheumatism, gout and the like well adapted for resorbing uric acid in the system. It may be applied externally by rubbing it into the affected limbs preferably mixed with a suitable vehicle or internally in gelatin capsules containing one-half gram, to be taken three times a day.

I claim as my invention:

1. The process of producing menthylated oil of wintergreen consisting in coupling menthol and oil of wintergreen by heating them in an atmosphere of carbon dioxid under pressure, and distilling the resulting product.

2. The process of producing menthylated oil of wintergreen consisting in coupling menthol and oil of wintergreen by heating same for a relatively long time in an atmosphere of carbon dioxid under pressure at a temperature slightly below the boiling point of the oil of wintergreen, and distilling the resulting product in a partial vacuum.

3. The process of producing menthylated oil of wintergreen consisting in coupling menthol and oil of wintergreen by heating same in an atmosphere of carbon dioxid under pressure to a temperature slightly below the boiling of the oil of wintergreen, distilling the resulting product in a partial vacuum, purifying the distillate by placing it in contact with solid caustic soda, and filtering same.

4. As a novel medicinal compound menthylated oil of wintergreen derived from menthol and oil of wintergreen, existing in form of an oily, clear, transparent liquid of light yellow color, soluble in concentrated alcohol, ether, chloroform and fatty oils and assuming a red color upon addition of chlorid of iron.

Signed at New York, N. Y., this 26th day of April, 1910.

GUSTAV BLIEBERGER.

Witnesses:
  LUDWIG K. BÖHM,
  GUSTAV C. ROEMER.